S. S. WHEELER.
MOTOR STARTING SWITCH.
APPLICATION FILED JUNE 7, 1921.

1,436,329.

Patented Nov. 21, 1922.

Inventor,
Schuyler S. Wheeler,
By Samuel W. Balch
Attorney.

S. S. WHEELER.
MOTOR STARTING SWITCH.
APPLICATION FILED JUNE 7, 1921.
1,436,329.
Patented Nov. 21, 1922.
5 SHEETS—SHEET 3.
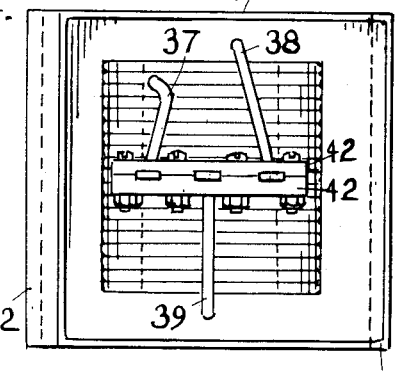
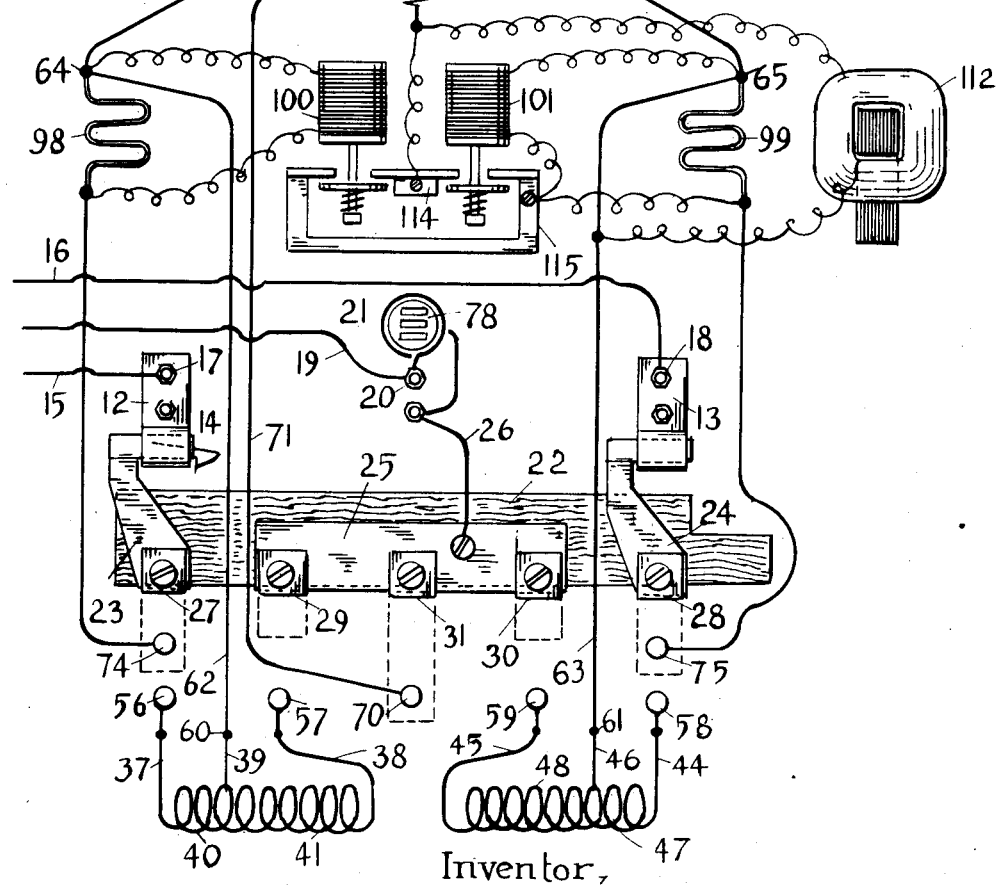
Inventor,
Schuyler S. Wheeler,
By Samuel W. Balch
Attorney.

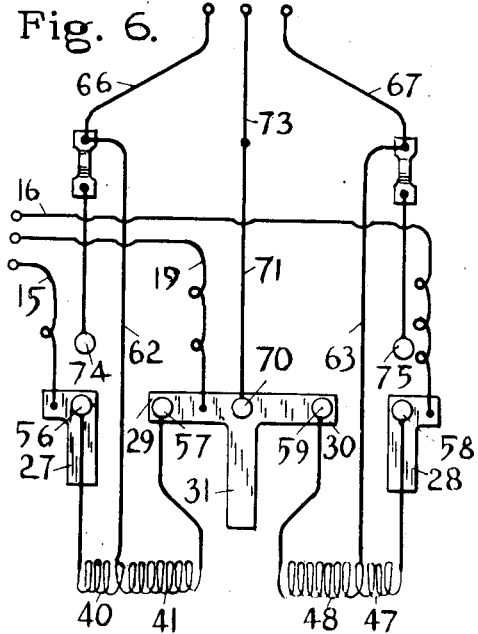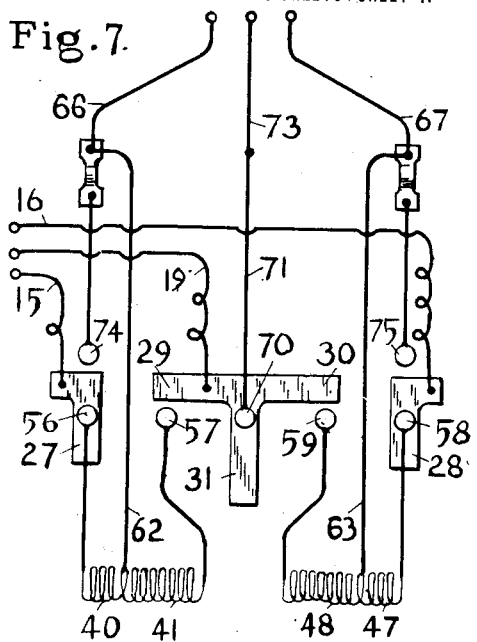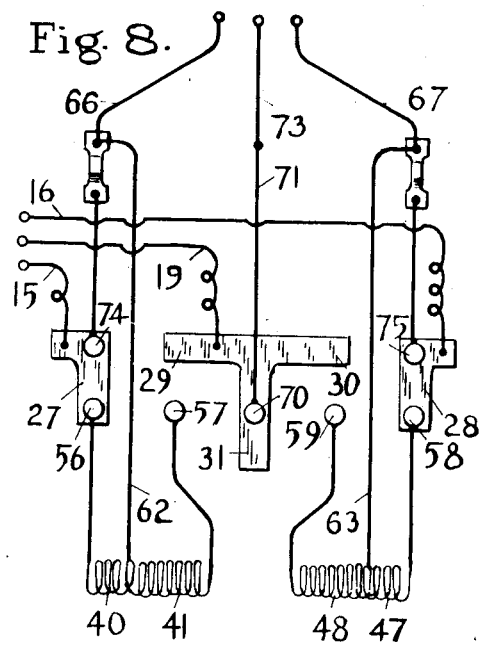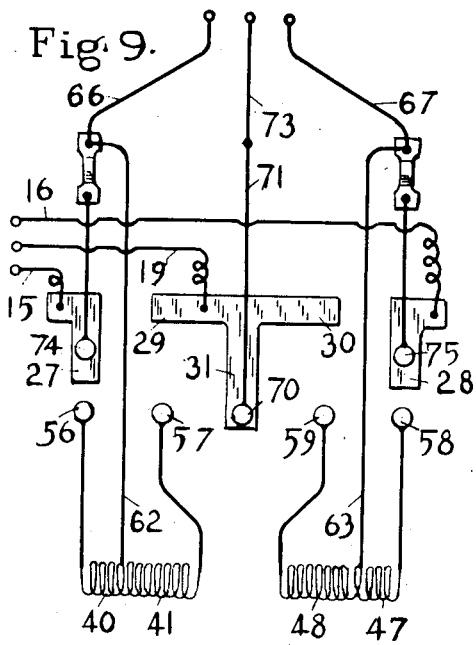

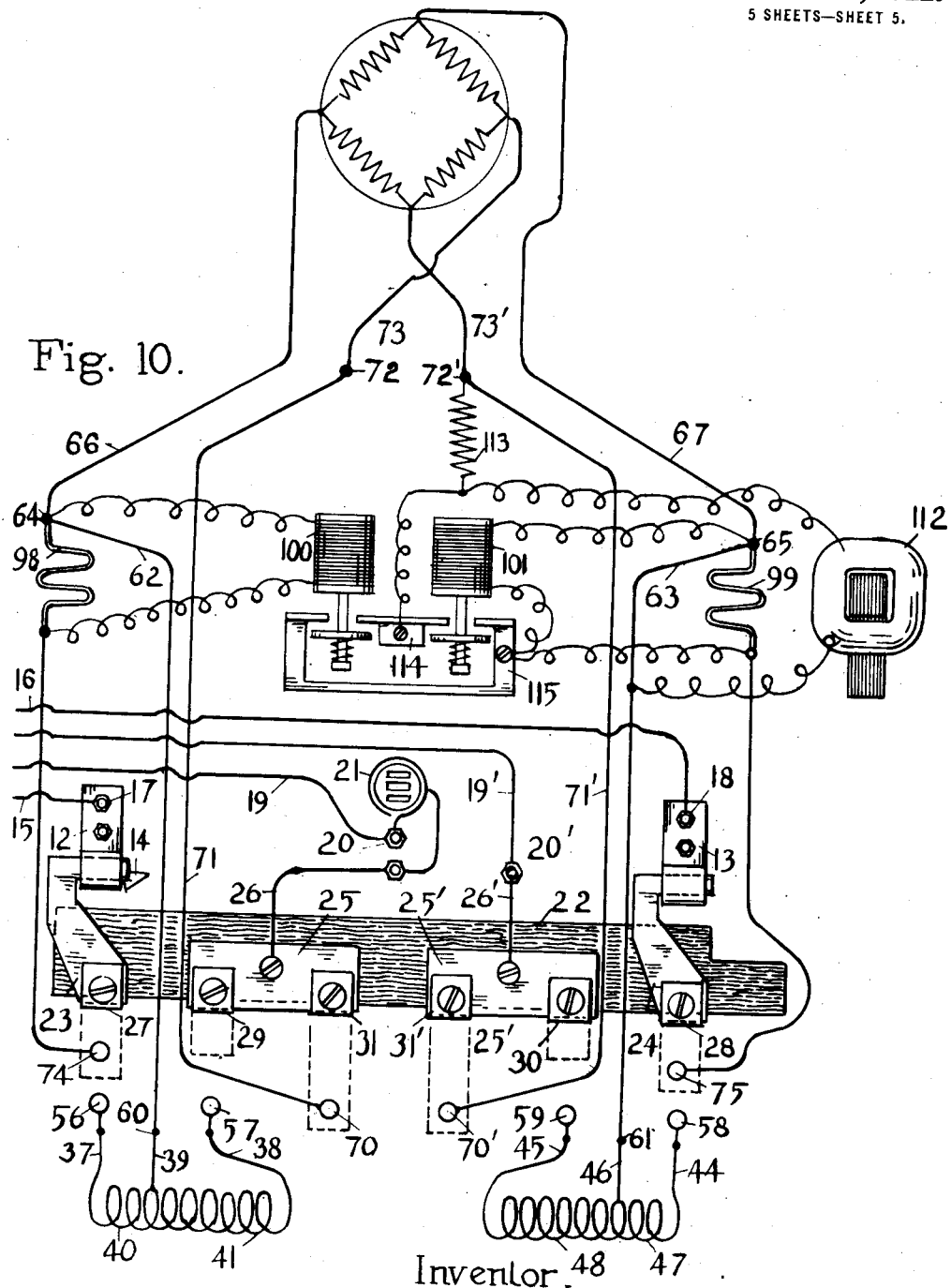

Patented Nov. 21, 1922.

1,436,329

UNITED STATES PATENT OFFICE.

SCHUYLER SKAATS WHEELER, OF BERNARDSVILLE, NEW JERSEY, ASSIGNOR TO CROCKER-WHEELER COMPANY, OF AMPERE, NEW JERSEY, A CORPORATION OF NEW JERSEY.

MOTOR-STARTING SWITCH.

Application filed June 7, 1921. Serial No. 475,785.

*To all whom it may concern:*

Be it known that I, SCHUYLER SKAATS WHEELER, a citizen of the United States of America, and a resident of Bernardsville, in the county of Somerset and State of New Jersey, have invented certain new and useful Improvements in Motor-Starting Switches, of which the following is a specification.

This invention relates particularly to electrical switches for starting alternating current motors of three-phase and two-phase type, but has certain features which are applicable to switches for other uses.

Objects are as follows: A switch is provided of simple construction in which the requisite contacts are made at a minimum number of points and with a minimum number of contact elements. There is such an arrangement of switch parts that there will be an economical use of connecting leads for the main circuits within the casing in which the switch is contained. The switch is provided with a movable switch member which is mounted on hinges separable by axial movement to release the switch member and it has such form and the contact fingers such location that when detached at the hinges it may be removed without disturbing the contact fingers. The circuits to the motor continue closed between the starting and the running positions whereby the torque is made continuous and breaking of contacts with consequent sparking is avoided in going to running position. The switch also serves as an overload and no-voltage circuit breaker, and in opening breaks the circuits in reverse order from that in which they are made in going to running position. The switch mechanism is combined with an enclosing casing by which the contact making parts are fully enclosed and these parts are mounted on an insulating backing which is supported in the casing. The casing carries independently of the backing, the transformers, the magnet for holding the switch closed and the shaft for the switch-handle. A signal is also provided which is of fixed sensitiveness so that it operates in one direction when the current rises above a certain point, and in the other when the current falls below a certain point. The signal is provided with a coil of the proper number of turns to suit the motor with which the switch is to be used, the signal being thereby adjusted to operate when the heavy current required in the first starting position flows through its coil, and to return when sufficient speed has been attained to warrant the further movement of the switch, so that by its return it will indicate to the operator that the switch may be moved to running position. The signal is adjusted so that it will operate in advance of overload release and therefore also serves as a warning of overload. The signal may be made to close a local bell circuit so that this warning will be audible. The spaces between the transformer windings and the laminations and cover are filled with any suitable compound to displace air and conduct the heat as a tar compound of hardwood pitch. The heat is conducted to the laminations and cover which are exterior to the casing and communicate their heat to the outside air.

In the accompanying five sheets of drawings,

Fig. 4 is a plan of one of the transformers.

Fig. 5 is a diagram of the circuits for a switch for a three-phase motor.

Figs. 6, 7, 8 and 9 are positional views showing the main circuits successively established in closing the switch.

Fig. 10 is a diagram of a switch modified for a two-phase motor with four leads.

Figure 1:
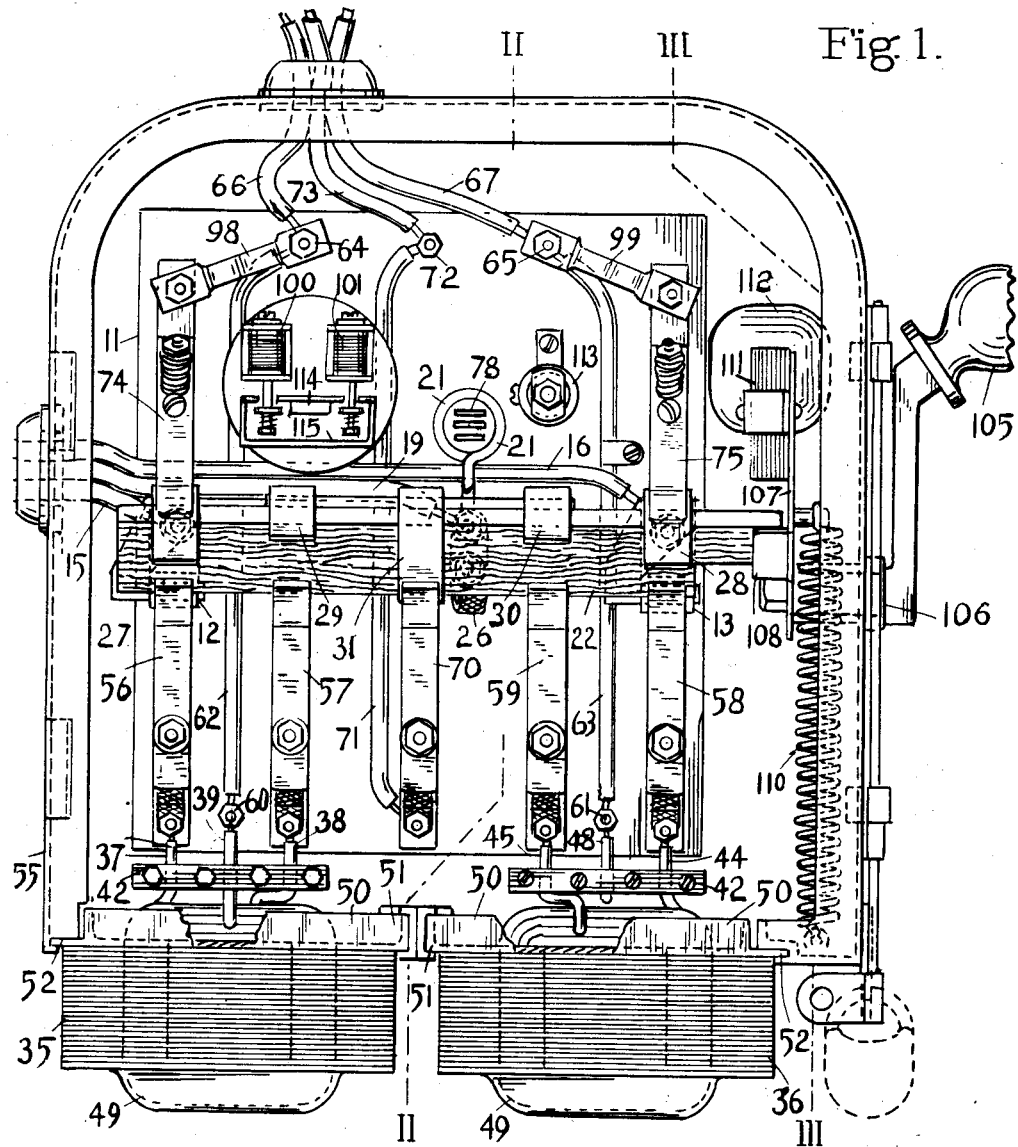
Figure 1 is an elevation of a motor starting switch and casing therefor, embodying this invention, the cover being omitted.
Figure 2:
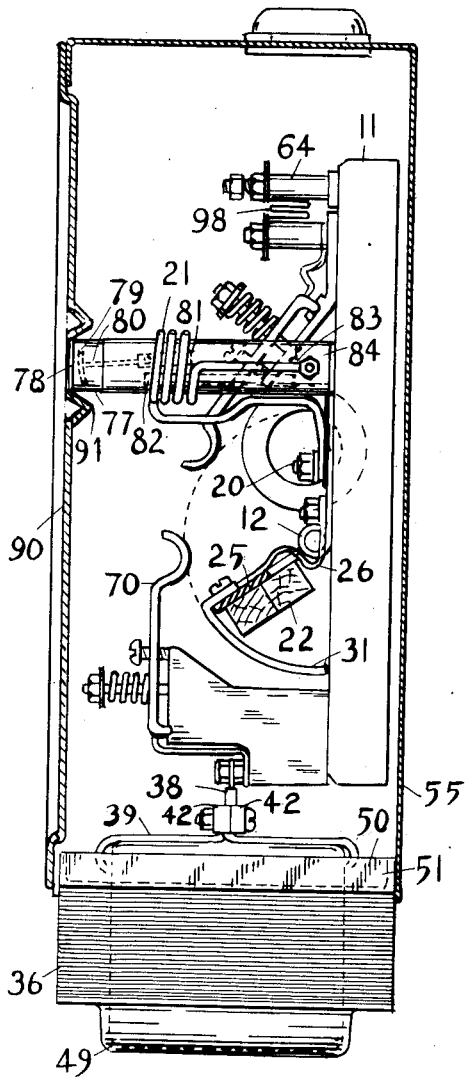
Fig. 2 is a vertical section on the line II—II of Fig. 1 showing the movable switch member, left hand transformer and signal.
Figure 3:
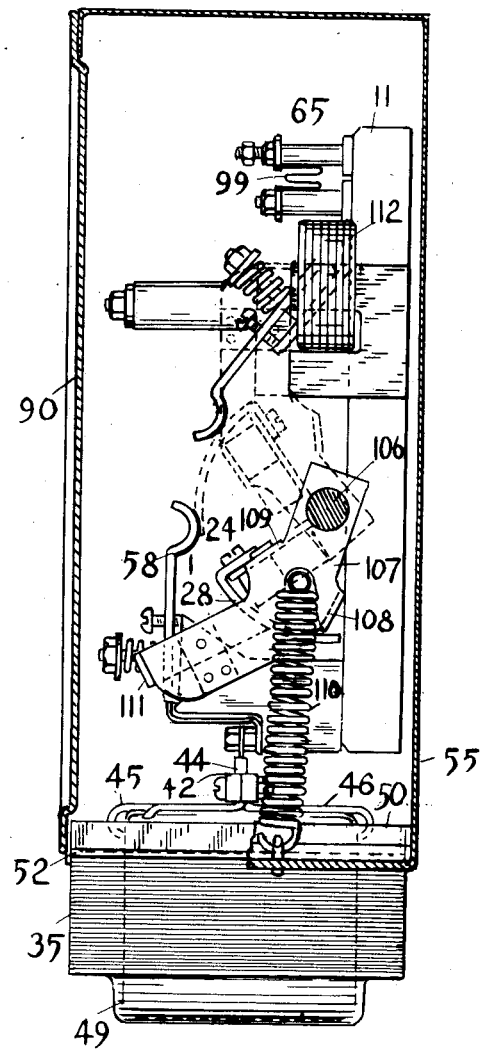
Fig. 3 is a vertical section on the line III—III of Fig. 1 showing the arm on the crank shaft through which the switch is operated, the right hand transformer, the holding magnet and the resistance in the holding-magnet circuit.

A slate slab 11 through two hinges 12, 13 carries the movable member of the switch. The hinges are separable by axial movement of the movable member or drum. Accidental separation is prevented by a latch 14. Two of the line leads 15, 16 connect to studs 17, 18 on the portions of the two hinges which are made fast to the slate slab, and the other line lead 19 connects to a stud 20 of a signal coil 21. The movable member or drum comprises a flat board 22, and the axis of the hinges is adjacent to and parallel with one of its edges. It carries plates 23 and 24, which are extensions of the parts of the two hinges which are attached to the board, and a plate 25 which is connected through a flexible copper braid 26 with the other terminal of the signal coil. The line leads are thereby connected to the drum-plates in all positions of the drum. Cylindrical contact segments 27, 28 are attached to the plates which are extensions of the hinges and through the hinges are connected to two of the line leads. Short cylindrical contact segments 29, 30 and a long cylindrical contact segment 31 are connected to the plate which connects with the other line lead through the flexible braid and signal coil. Developments of these segments are shown in dotted lines in Fig. 5.

There are two auto-transformers consisting of coils wound on laminated cores 35, 36. The coils of the first transformer have end terminals 37, 38 and an intermediate tap 39 placed so that thirty percent of the winding 40 is between the end terminal 37 and the intermediate tap, and seventy percent of the winding 41 is between the end terminal 38 and the intermediate tap. The end terminals and the intermediate tap are brought into a horizontal line over the middle of each transformer and are held in position by clamps 42, 42 which engage the leads just below the ends. The coils of the second transformer have end terminals 44, 45 and an intermediate tap 46 with thirty percent of the winding 47 between the end terminal 44 and the intermediate tap, and seventy percent of the winding 48 between the end terminal 45 and the intermediate tap. The two transformers are alike and interchangeable. The undersides of the transformers are covered with pan-shaped plates 49, 49 and the upper sides with top frames 50, 50, the laminations being clamped between them. The frames project beyond the laminations on two sides to form unlike slides 51, 52. The switch parts are contained in a casing 55 the bottom of which has two seats or openings in which the top frames of the transformers slide. Owing to the dissimilarity of the slides on the two sides of its top frame a transformer can be inserted in but one way and must be turned around if changed from one seat in the casing to the other, and the terminals will in either position be presented for connection so that the thirty and seventy percent. sections of the transformer coils will be properly included in the switch circuits. The end terminals of the auto-transformers are connected to contact fingers 56, 57, 58 and 59, and the intermediate taps are connected to studs 60, 61 from which there are leads 62, 63 inside the casing to other studs 64, 65 to which the motor leads 66, 67 are connected.

A contact finger 70 receives current in all operated positions of the switch through the long contact segment from the line and a lead 71 connects the contact finger with a stud 72 which is conveniently located for connection thereto of the motor through the motor lead 73. Contact fingers 74, 75 receive current in the final closed position of the switch through contact segments which connect with the line leads through the hinges. These contact fingers are connected with the motor leads which are also connected to the intermediate transformer taps.

A signal is provided with a fixed degree of sensitiveness so as to indicate when the current rises above a certain point and also to indicate when the current falls below a certain point. This comprises a tube of fibre 77 which fits in and is supported by the signal coil heretofore mentioned. At one end of the tube is a cap 78 with sight openings, and back of the openings is a target 79 with stripes corresponding to the openings. The target is carried at one end of a lever 80 and the other end of the lever is an armature 81 which is drawn toward a core 82 when the current in the surrounding coil rises above the point for which the signal is adjusted and the coil selected. As proper adjustment may sometimes require a fractional number of turns, one terminal 83 of the coil is carried to an axially disposed block 84 at the rear of the core to permit the inclusion of a fractional turn.

The signal is within the casing and is viewed through a casing door 90 which has a coned opening 91 which fits the rim of the signal with the face of the signal below the face of the door so that it is protected.

Shunts 98, 99 to overload relays 100, 101 are inserted in the connections which are made in the final closed position of the switch. These shunts are sheet iron strips of low resistance when cold and have the property of increasing in resistance when heated. The portions of the currents which they ordinarily divert are insufficient to operate the relays. The relays and the shunts are adjusted so that if current sufficient to harm the motor if sustained, flows through either lead and its shunt to the motor for a sufficient time to heat the shunt and raise its resistance then current will be diverted to the relay sufficient for its operation.

The contact fingers are disposed in two rows along two cylinder elements of the drum with their tips facing and with sufficient space between their tips for the passage of the board on which the contact segments are mounted to constitute the drum. There are also spaces between the contact fingers in each row which are greater than the widths of the contact segments so that the drum when it is freed at the hinges and the flexible braid detached may be withdrawn without having to remove the fingers.

The switch is manually operated by a handle 105 outside of the casing which connects through a shaft 106 with a driving arm or hammer 107 which has lugs 108, 109 positioned to engage opposite sides of the end of the drum. These lugs are placed so that on reversing there will be lost motion and the arm will have some initial movement before it drives the drum and will start it with a hammer blow. This is important, particularly when the switch is required to open automatically, for such opening is effected by a helical tension spring 110 which is connected between the driving arm and the casing in such manner that it will line up close to the axis of motion of the driving arm when fully operated and will pull on a longer leverage and therefore with increased power after the arm has moved sufficiently on the return to engage the drum. The driving arm also carries a laminated armature 111 which, when the switch is closed and the arm fully operated, engages with a holding magnet 112 which is fastened to a casting at the side of the casing. The magnet coil is connected between two of the motor leads and there is a resistance element 113 in series in the connection. Connections from this magnet coil are also carried to contacts 114, 115 which are closed by either of the overload relays. The holding magnet therefore releases the driving arm and permits the spring to open the switch either upon failure of current on the motor leads or when an overload relay operates and provides a better path through its contacts than through the holding magnet for such currents as pass through the resistance element.

The circuits successively made in closing the switch are as follows: (a) The end terminals of the transformers are connected to the line leads. As there are four end terminals and three line leads, one end terminal of each transformer is connected to the same line lead. These latter end terminals and this line lead are also connected to a motor lead, and, as seventy percent taps of the transformers are permanently connected to the other motor leads, the motor is thereby connected to seventy percent of the transformers. This particular percentage is not essential but is found to be suitable in most cases. The operator is instructed to hold the switch at this connection until the motor has speeded up sufficiently to warrant turning the switch to the running position, and means not shown may be provided to compel a pause at this position. (b) The two transformer terminals which were connected to one line lead are disconnected, the other connections remaining as in the former position, and the motor is thereby left connected to the line leads through thirty percent of the transformer windings which act as impedance coils. (c) The motor leads which are connected to the impedance coils in the previous position are also directly connected to the line leads through the shunts, thereby short circuiting the impedance coils. These last two steps may be passed rapidly in operating the switch and are introduced to avoid opening the motor circuits after they have been made and to reduce sparking but they are not essential to many features of this invention. (d) The remaining end-terminals of the transformer coils are disconnected, thereby opening the short circuits of the impedance coils and leaving the motor directly connected through the iron shunts.

In opening the switch the circuits above defined are made in reverse order.

In the form shown in Fig. 10, which shows the switch modified for a two-phase motor with four leads, the movable switch member is lengthened so that an additional line lead 19' may be connected through a plate 25' on the movable switch member with a long contact segment 31' and through an additional contact finger 70' with an additional motor lead 73'. As thus modified all of the four transformer terminals are connected independently to the four line leads in the first position of the switch.

I claim.

1. In a motor starting switch, a movable member having contact segments to which all of the line leads are flexibly connected, transformer coils, and fingers which contact with the segments and are permanently connected to the transformer coil terminals and to the motor leads, the contact segments being shaped and the fingers located so as to connect the transformer coil terminals to the line and motor leads in one position of the switch and to directly connect the line and motor leads in the final closed position of the switch.

2. In a motor starting switch, a hinged movable member having contact segments to which the line leads are flexibly connected, two line leads being connected through the hinges, auto-transformers, and fingers which contact with the segments and are connected to the transformer coil terminals and to the motor leads, the contact segments being shaped and the fingers located so as to connect the transformer coil terminals to the line and motor leads in one position of the switch and to directly connect the line and the motor leads in another position of the switch.

3. In a motor starting switch, a hinged movable member having contact segments to which the line leads are flexibly connected, auto-transformers each having two end terminals and an intermediate tap, connections between the intermediate taps of the transformers and the motor leads, and fingers which contact with the segments and are connected to the transformer coil terminals and to the motor leads, the contact segments being shaped and the fingers located so as to connect the transformer coil terminals to the line and motor leads in one position of the switch and to directly connect the line and the motor leads in another position of the switch.

4. In a motor starting switch, a hinged movable member having contact segments to which the line leads are flexibly connected, two line leads being connected through the hinges, auto-transformers, and fingers which contact with the segments and are connected to the transformer coil terminals and to the motor leads, the contact segments being shaped and the fingers located so as to connect the transformer coil terminals to the line and motor leads in one position of the switch and to directly connect the line and the motor leads in another position of the switch, and the switch having an off position in which all of the line leads are disconnected from the transformer terminals and the motor leads.

5. In a motor starting switch, a hinged movable member having contact segments to which the line leads are flexibly connected, auto-transformers each having two end terminals and an intermediate tap, connections between the intermediate taps of the transformers and the motor leads, and fingers which contact with the segments and are connected to the transformer coil terminals and to the motor leads, the contact segments being shaped and the fingers located so as to connect the transformer coil terminals to the line and motor leads in one position of the switch and to directly connect the line and the motor leads in another position of the switch, and the switch having an off position in which all of the line leads are disconnected from the transformer terminals and the motor leads.

6. In a motor starting switch, a movable member having contact segments to which the line leads are connected, auto-transformers each having two terminals and an intermediate tap, connections between the intermediate tap of the transformers and the motor leads, fingers which contact with the segments and are connected to the transformer coil terminals, connections between the motor leads and the transformer coil taps, fingers which connect the motor leads directly to the line leads when the transformer circuits are broken, and means operative on an excessive flow of current which are located in the connections between the latter fingers and the motor leads the operation of which effects the breaking of the motor circuits.

7. In an electrical switch in which cylindrical contact segments cooperate with contact fingers, a movable member consisting of a flat board hinged at one edge and carrying cylindrical contact segments at its opposite edge for cooperating with the contact fingers.

8. In an electrical switch in which connections are effected between fixed terminals for incoming leads and contact fingers through cylindrical contact segments, the combination of a movable member consisting of a flat board hinged at one edge and carrying cylindrical contact segments which are permanently connected to the stationary terminals through flexible connections adjacent to the hinge axes, the contact segments cooperating with the contact fingers.

9. In an electrical switch in which connections are effected between fixed terminals for incoming leads and contact fingers through cylindrical contact segments, the combination of a movable member consisting of a flat board carried by two hinges at one edge and carrying a plurality of cylindrical contact segments which are permanently connected to the fixed terminals through flexible connections, two of the flexible connections being through the hinges.

10. In an electrical switch, a movable member, cylindrical contact segments carried by the movable member, fingers cooperating with the cylindrical contact segments, and hinges carrying the movable member which are separable by axial movement of the movable member.

11. In an electrical switch, a movable member consisting of a flat board, cylindrical contact segments carried by the flat board at one edge, and fingers cooperating with the contact segments disposed along two cylinder elements with a space between their lines of tips in excess of the thickness of the flat board to admit of its being removed between them.

12. In an electrical switch, a movable member consisting of a flat board, cylindrical contact segments carried by the flat board at one edge, fingers cooperating with the contact segments disposed along two cylinder elements with a space between their lines of tips in excess of the thickness of the flat board to admit of its being removed between them, and hinges carrying the movable member which are separable by axial movement of the movable member.

13. In a motor starting switch, a movable member having contact segments to which the line leads are connected, auto-transformers each having two end terminals and an intermediate tap, connections between the intermediate taps of the transformers and the motor leads, fingers which contact with the segments and are connected to the transformer coil terminals, connections between the motor leads and the transformer coil taps, and fingers which connect the motor leads directly to the line leads when the transformer circuits are broken, the segments being shaped and the fingers located so that on initial closure circuits are established between the end terminals of the transformers and the line leads and between one end terminal and an intermediate tap of each transformer and the motor leads, on movement to second position one end terminal of each transformer is disconnected from the line without breaking other connections previously established whereby connection between two of the line leads and two of the motor leads is continued with a section of each transformer included in series, on movement to third position the previous connections are continued with short circuiting of the included transformer sections, and on movement to final position the connections between the line leads and the motor leads through the transformer sections are broken and direct connections between the line leads and the motor leads are continued.

14. In a motor starting switch, a casing, a movable member within the casing having a starting position and a running position, circuit connections to the movable member, and a signal within the casing which is connected in a main circuit controlled by the switch, the signal having a fixed degree of of sensitiveness by which it is caused to change when the starting current is admitted and the degree of sensitiveness to changing back is such that it will change back when the motor has acquired sufficient speed to admit of the switch being moved from the starting to the running position without admitting an excessive flow of current.

15. In a motor starting switch, a casing, a transformer, a movable member within the casing having a starting position and a running position, circuit connections to the movable member including line leads, transformer leads and motor leads, and a signal within the casing which is connected in series in one of the line leads so that current passes through it to the transformer and to the motor, the signal having a fixed degree of sensitiveness by which it is caused to change when current is admitted to the transformer at a starting position and the motor has not attained sufficient speed to warrant the closing of the switch at the running position, and the degree of sensitiveness to changing back is such that it will change back when the motor has acquired sufficient speed to admit of the switch being moved from the starting to the running position without admitting an excessive flow of current.

16. In an alternating current motor starting switch, a casing, a movable switch member contained therein, two transformers with their leads terminating in fixed relation thereto, seats in the casing in which the transformers are secured and which are constructed so that the transformers cannot be reversed therein but which require that a transformer be reversed when transferred from one seat to the other, and fixed connecting points in the casing for the transformer leads.

17. In an autotransformer starter for alternating current motors, two transformers identical in construction and means to insure that one shall be turned around before assembling so that the two will serve respectively as right handed and left handed transformers.

18. In a motor starting switch for closing a circuit to a motor, automatic means for operating the switch to open the circuit, means for holding the switch closed, means operative on an excessive flow of current for releasing the switch, and a signal connected in the circuit having a fixed degree of sensitiveness by which it is caused to change in advance of the rise in current flow at which the switch is released.

19. In a motor starting switch, a casing, a signal within the casing, and a door for the casing with a depressed opening which fits the rim of the signal when the door is closed.

20. In a motor starting switch, a switch casing, a switch within the casing, and transformers each external to the casing and itself metallically enclosed with the space between its coils and its enclosure filled with air displacing and heat conducting material.

SCHUYLER SKAATS WHEELER.